United States Patent
George et al.

(10) Patent No.: US 9,876,230 B2
(45) Date of Patent: Jan. 23, 2018

(54) BATTERIES

(75) Inventors: Peter Anthony George, Dana Point, CA (US); Quansheng Song, Maroochydore (AU); Geoffrey Alan Edwards, Coolum Beach (AU)

(73) Assignee: NANO-NOUVELLE PTY LTD, Marcoola, Queensland (AU)

( * ) Notice: Subject to any disclaimer, the term of this patent is extended or adjusted under 35 U.S.C. 154(b) by 0 days.

(21) Appl. No.: 14/005,012

(22) PCT Filed: Mar. 15, 2012

(86) PCT No.: PCT/AU2012/000266
§ 371 (c)(1),
(2), (4) Date: Nov. 13, 2013

(87) PCT Pub. No.: WO2012/122600
PCT Pub. Date: Sep. 20, 2012

(65) Prior Publication Data
US 2014/0057169 A1 Feb. 27, 2014

(30) Foreign Application Priority Data
Mar. 15, 2011 (AU) .............................. 2011900925

(51) Int. Cl.
*H01M 4/62* (2006.01)
*H01M 4/04* (2006.01)
(Continued)

(52) U.S. Cl.
CPC ......... *H01M 4/622* (2013.01); *H01M 4/0402* (2013.01); *H01M 4/0404* (2013.01); *H01M 4/0438* (2013.01); *H01M 4/13* (2013.01); *H01M 4/139* (2013.01); *H01M 4/366* (2013.01); *H01M 4/624* (2013.01); *H01M 4/66* (2013.01); *H01M 4/661* (2013.01); *H01M 4/667* (2013.01); *H01M 4/668* (2013.01); *H01M 4/80* (2013.01); *H01M 10/052* (2013.01); *H01M 2004/021* (2013.01)

(58) Field of Classification Search
CPC .......... H01M 10/052; H01M 10/0525; H01M 2/1653; H01M 4/366
See application file for complete search history.

(56) References Cited

U.S. PATENT DOCUMENTS 5,260,855 A * 11/1993 Kaschmitter ....... C04B 38/0022
264/28
5,748,438 A  5/1998 Davis et al.
(Continued)

FOREIGN PATENT DOCUMENTS

CN 1489229 4/2004
DE 3912735 A1 10/1990
(Continued)

OTHER PUBLICATIONS

International Search Report and Written Opinion of the International Searching Authority, dated May 30, 2012.
(Continued)

*Primary Examiner* — Olatunji Godo
(74) *Attorney, Agent, or Firm* — Steptoe & Johnson LLP

(57) ABSTRACT

A battery electrode comprising a porous polymeric material having at least a coating of an active material applied thereto. The battery electrode may be a 3-dimensional electrode.

41 Claims, 11 Drawing Sheets

(51) Int. Cl.
*H01M 4/13* (2010.01)
*H01M 4/139* (2010.01)
*H01M 4/36* (2006.01)
*H01M 4/66* (2006.01)
*H01M 4/80* (2006.01)
*H01M 10/052* (2010.01)
*H01M 4/02* (2006.01)

(56) References Cited

U.S. PATENT DOCUMENTS

| | | |
|---|---|---|
| 9,058,931 B2 | 6/2015 | Long et al. |
| 2004/0072066 A1 | 4/2004 | Cho et al. |
| 2005/0266150 A1* | 12/2005 | Yong et al. ............ 427/58 |
| 2006/0222840 A1 | 10/2006 | Frisk et al. |
| 2008/0086876 A1* | 4/2008 | Douglas ........ B82Y 10/00 29/846 |
| 2009/0068553 A1* | 3/2009 | Firsich ........... D21H 13/50 429/122 |
| 2009/0166209 A1 | 7/2009 | Gertner |
| 2009/0317710 A1* | 12/2009 | Douglas ........ H01M 2/0275 429/163 |
| 2010/0176767 A1* | 7/2010 | Long ............. H01M 4/133 320/137 |
| 2010/0210453 A1* | 8/2010 | Hu et al. ............ 502/184 |

FOREIGN PATENT DOCUMENTS

| | | |
|---|---|---|
| DE | 102009030558 A1 | 12/2010 |
| JP | 05314994 A | 11/1993 |
| JP | 2002352850 A | 12/2002 |
| JP | 2005100835 A | 4/2005 |
| KR | 20080035293 A | 4/2008 |
| WO | WO 2009065023 * | 5/2009 |
| WO | 2010103927 A1 | 9/2010 |

OTHER PUBLICATIONS

Written Opinion of the International Preliminary Examining Authority, dated Dec. 5, 2012.
International Preliminary Report on Patentability, dated Mar. 22, 2013.
Office Action for Chinese application 201280018628.3 dated Feb. 15, 2016 (with English Translation).
Notice of Rejection dated Dec. 1, 2015 in Japanese Patent Application No. 2013-558268 (6 pages).

* cited by examiner

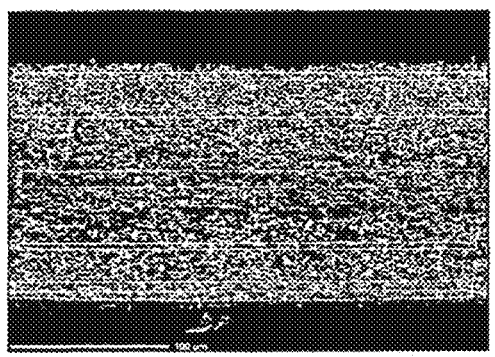 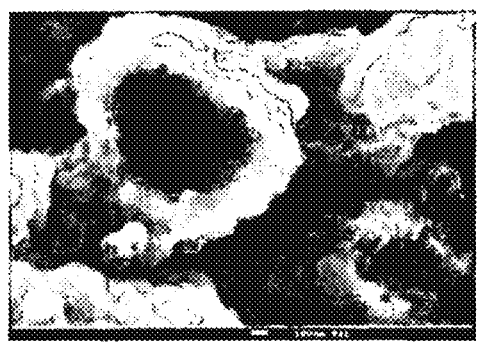
Figure 6a.                                    Figure 6b.
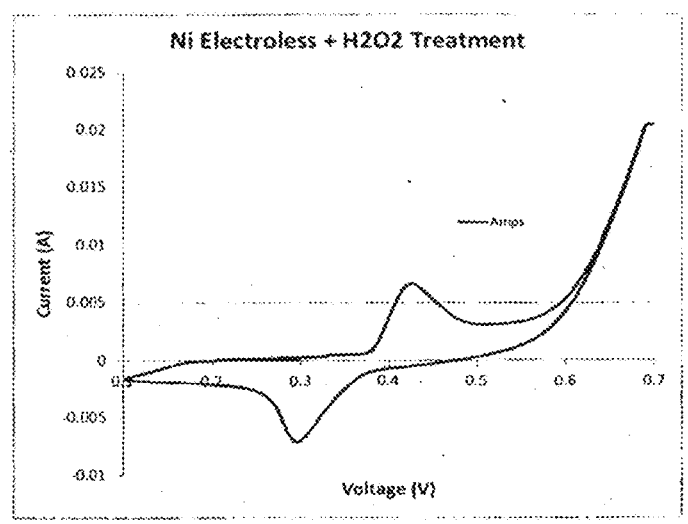
Figure 7

BATTERIES

CLAIM FOR PRIORITY

This application claims priority under 35 USC 371 to International Application No. PCT/AU2012/000266, filed on Mar. 15, 2012, which claims priority to Australian Application No. 2011900925, filed on Mar. 15, 2011, each of which is hereby incorporated by reference in its entirety.

FIELD OF THE INVENTION

The present invention relates to novel batteries and related methods for their manufacture.

BACKGROUND TO THE INVENTION

A wide range of battery technologies exist today. However there is considerable demand for batteries that deliver much higher performance. In particular, higher energy densities, and/or higher available power for a given energy density, are desirable. Energy density may be expressed in terms of energy per unit volume, energy per unit mass and energy per unit area. Different product applications prioritise each of these differently.

Current battery technology may be described as planar or essentially 2-D. A schematic diagram of a current technology lithium ion battery is shown in FIG. 1. Lithium ions travel from one electrode to the other. The direction of travel changes depending on whether the battery is charging or discharging. The cathode electrode 10 is made up of a lithium insertion material, e.g. lithium manganese oxides, in the form of particles 12. These particles are mixed with carbon-based particles 14 which enhance conductivity, and the particle mix is bound using a polymer binder.

For a lithium ion to travel from anode 18 to cathode 10, it must first diffuse out of a carbon particle and through the gaps in the carbon particles of the anode, then across the ~25 µm electrolyte gap/separator 20 gap, then through the mix of carbon particles and lithium manganese oxide particles, then actually insert into a lithium manganese oxide particle. An electrode may be up to 100 µm thick. Thus a lithium ion may have to travel up to 100 µm through the mix, then 1-3 µm into the oxide particle.

Lithium ion transport is critical to the operation of the cell. The more difficult the transport, the higher the internal resistance. This resistance can limit performance, by reducing charge/discharge rates and increasing heat.

Electron transport is also critical. In FIG. 1, electrons must move in and out of the particles of lithium manganese oxide, which is the active electrode material. Such materials can have poor electronic conductivity. The electrons must then move through a tortuous, discontinuous path of particles of lithium manganese oxide and carbon particles. This resistance can also limit performance, by reducing charge/discharge rates and increasing heat.

So-called 3-D electrodes and 3-D batteries have been proposed as a way of circumventing the problems associated with planar technology to give higher performance. A 3-D electrode is shown in FIG. 2. In this diagram, lithium ions can move freely through the electrolyte over the whole electrode thickness, i.e. there is no particle mix to wind their way through. The lithium insertion material, e.g. lithium manganese oxide, is present as a very thin coating (e.g. 100 nm) on conducting nano-cylinders 32. Thus the greatest distance the lithium ion has to insert into the lithium manganese oxide is only the thickness of the coating. Furthermore, the conducting pathway is continuous, and provides a much better route for electron migration. Electron movement through the lithium manganese oxide is also minimised.

This concept is further developed with the complete 3-D battery, shown in FIG. 3. The 3-D battery has interconnected 3-D electrodes, being anode 34 and cathode 36 that are separated by a very thin film of electrolyte 38. This minimises the distance the lithium ion must travel, further decreasing internal resistance.

3-D batteries have proven difficult to construct. A commonly used approach with the electrodes is to use cylinders that are grown from an electrode into a porous template (shown in FIG. 4A). to form a filled template (FIG. 4B) The template is removed to leave the cylinders (FIG. 4C). This process is awkward and difficult to scale, and there are problems with removing the template while keeping the cylinders intact. Also, to achieve sufficient surface area, the cylinders should be very thin. Since battery electrodes are normally relatively thick (~100 µm) the cylinders may have a very high aspect ratio. Thin fibres of high aspect ratio have been known to cause asbestosis.

Another way of making a 3-D electrode is to first make nanowires, then chop them and combine somehow (e.g. conductive binder, heat) to form the electrode. This method still has the previous safety concerns over nanowires, and also it can be difficult to make nanowires at scale.

Other methods involve applying a coating of active material to conducting metal meshes. By active material, we mean a material that is able to transform between charged and discharged states. The higher the number of charge/discharge transformations that the material can withstand, the higher the stability of the material. U.S. patent application 2010/0035153A1 to Thackeray et. al. describes battery anode materials made by electrodepositing various tin alloys onto copper mesh. Such mesh materials are very coarse structures and have extremely low surface areas. The disadvantage of low surface area materials is that thicker coatings must be applied in order to achieve reasonable energy capacities. Thicker coatings have diminished rate characteristics compared to thinner coatings. By rate characteristics, we mean the ability to charge and discharge at high rates. Materials with good rate characteristics can charge and discharge at high rate without excessive resistance effects such as heat build up and losses. The metal meshes are examples of substrates that are themselves conducing. Thus the coating by itself, need not provide a continuously conductive path, however for thicker coatings reasonable conductivity may be desirable.

Other methods include impregnating or filling voids between polymer spheres or arrays of polymer spheres such as 'inverse opal' structures. However these are also expensive and difficult methods and generally do not provide high surface area substrates.

Further methods include coating a polymer foam material with a metal, then removing the polymer to create a metal foam, then coating with metal foam with active material. However such metal foams can be expensive, they are generally quite thick (>1 mm) and have low surface areas.

Carbon aerogels have also been utilised as a conducting substrate to support $MnO_2$. However carbon aerogels are expensive, can contain a lot of very small pores that are inaccessible to ions, and generally contain quite high volume fractions of carbon, leaving less room for active material. Carbon aerogels are an example of a conductive substrate. Again, in this instance the coating, by itself, need not provide a continuously conductive path.

There is clearly a need for battery materials and methods that enable simpler, more cost effective and safe 3-D battery materials.

The present inventors have surprisingly found that it is possible to manufacture 3-D batteries using various porous polymeric materials as a framework for deposition of materials to form an interconnected array of materials that can provide battery electrodes. The invention relates to such electrodes and to batteries incorporating such electrodes.

DESCRIPTION OF THE INVENTION

According to a first aspect, the present invention provides a battery electrode comprising a porous polymeric material having at least a coating of an active material applied thereto.

Throughout this specification, the term "an active material" will be used to refer to a material that may transform between charged and discharged states. The more charge/discharge transformations (or cycles) that a material can withstand, the greater the stability of the material.

In some embodiments, the coating may comprise an active battery electrode material. In some embodiments, the active material has reasonable conductivity. In other embodiments, the active material has low conductivity.

In some embodiments, the coating may be comprised of both a conducting material that is essentially inert as a battery material, and an active material. In further embodiments the conducting material is continuous.

The battery electrode may be used as an anode. The battery electrode may be used as a cathode.

In one embodiment, the polymeric material may be partly or wholly removed after the coating has been applied to the polymeric material. In this embodiment, the polymeric material may be removed at any stage following coating with the active material. The polymeric material may be removed using any process known to be suitable to the person skilled in the art.

In some embodiments, the electrode may further include a layer of backing material. The backing material may comprise a layer of metal.

In some embodiments, a coating comprising a layer of a conductive material is applied to the porous polymeric material. One or more battery electrode materials may subsequently be applied to the layer of conductive material to form the battery electrode.

The coating applied to the porous polymeric material may comprise a continuous coating or a discontinuous coating. A discontinuous coating is a coating in which there are two or more regions of separate coating material located on or within the porous polymeric material. The discontinuous coating may be comprised of particles.

The coating may extend substantially through the thickness of the porous polymeric material. In other embodiments, the coating may extend only partly into the thickness of the porous polymeric material or only extend partly through the porous polymeric material.

In some embodiments, the porous polymeric material has a specific surface area of greater than 0.1 $m^2/cm^3$, more preferably greater than 0.2 $m^2/cm^3$, more preferably greater than 1 $m^2/cm^3$, even more preferably greater than 4 $m^2/cm^3$, further preferably greater than 10 $m^2/cm^3$, even further preferably greater than 50 $m^2/cm^3$. These specific surface areas are determined prior to coating of the porous polymeric material. Generally higher surface areas result from finer structures which lead to greater difficulties in providing coatings.

In some embodiments, the porous polymer structure is a non-conductive structure. By non-conductive we mean the structure itself has substantially no conductivity or very low conductivity. In these embodiments, the coating must provide sufficient conductivity since little or no conductivity is provided by the substrate itself. In some of these embodiments, the non-conductive structure may have complex pore structures, or high surface areas, or both. In such embodiments the combination of requirements for sufficient coating conductivity with complex pore structures and high surface areas can be particularly challenging. Surprisingly, in the present invention, the inventors have found that it is possible to achieve battery electrode properties by providing a coating onto non-conductive, porous polymer substrates with tortuous pore structures. It is also possible to achieve battery electrodes by providing a coating onto non-conductive, porous polymer substrates with tortuous pore structures and high surface areas.

In some embodiments, the pore structure in the porous polymer is complex. By a complex pore structure, we mean that pores may twist and turn, following a tortuous path, and/or the pores may have a wide range of sizes. Such pore structures are generally more difficult to deposit coatings on, compared with simple pore structures with straight, even pores, since access can be much more difficult.

In some embodiments, the porous polymer material with an active coating has a complex pore structure and a specific surface area of greater than 0.1 $m^2/cm^3$, more preferably greater than 0.2 $m^2/cm^3$, more preferably greater than 1 $m^2/cm^3$, even more preferably greater than 4 $m^2/cm^3$, further preferably greater than 10 $m^2/cm^3$, even further preferably greater than 50 $m^2/cm^3$. These specific surface areas are determined prior to coating of the porous polymeric material.

Any porous polymer material that produces a suitable framework may be used. Examples of suitable porous polymer substrates include papers, filter papers, and filter membranes. The coating may be done in such a manner as to coat a sheet of organic material throughout the thickness of a free standing sheet. Alternatively, if the thickness of the sheet is greater than desirable for the battery electrode, the coating may be applied in such a manner as to only partially penetrate the sheet. Removal of the organic material leaves a coated material of desired thickness.

Alternatively a film or organic framework may be provided as a film on a substrate, i.e. the organic framework is not free standing. In this embodiment, the porous material may have a backing layer applied to it (either before or after coating). The backing layer may provide further support to the porous material. The backing layer may comprise a conductive material. The backing layer may comprise a metal layer.

The porous polymer material may comprise a porous filter membrane material. These may be made from a variety of polymers, including cellulose (such as paper filters), cellulose nitrate, cellulose acetate, mixed cellulose esters, nylon, PTFE (Teflon), polyether sulfones (PES), polyamides, vinyl polymers and polycarbonates. Porous filter membrane materials are available in a range of pore types and sizes. Typically the pore sizes are specified by the maximum particle size that can pass through the membrane. For example, a particular membrane type may be available in specified pore sizes from 0.1 μm to 10 μm. Track-etched filter membranes (typically polycarbonates) have straight cylindrical pores. However many membranes have much more complex and irregular pore structures. These include the cellulose-based filter membranes, and some nylon, PTFE and PES filter membranes.

The porous polymeric material may have a wide range of thicknesses, for example a few micrometers thick up to hundreds of micrometers thick or even greater into the millimeter range. Preferably, the thickness is chosen to be advantageous for a particular application.

In some embodiments, the coating that is applied to the porous polymeric material may comprise a thin coating. For example, the coating may be less than 500 nm thick, or preferably less than 200 nm thick, even more preferably less than 100 nm thick, even more preferably less than 50 nm thick; or less than 20 nm thick. The optimum thickness may vary for different battery types or applications. For example, a thinner coating may provide faster charge/discharge rates, but lower energy capacity, compared to a thicker coating. This may be desirable for some applications. For other applications, energy capacity may have greater relative importance thus a thicker coating may be desirable.

The coating may comprise a composite material. The composite material may comprise a single layer of a composite material. The coating may comprise a plurality of layers of a composite material. The coating may comprise a first layer of the first material and a second layer of different material.

In some embodiments, the coating comprises an active material and a further conducting material. The further conducting material may be applied to the porous polymeric material and the active material may be applied to the further conducting material.

In some embodiments, the coating comprises an essentially inert, non-conducting material, in addition to any active material or materials or and any conducting material or materials in the coating.

In some embodiments, the coating may comprise a thin layer of conducting material, with another layer of at least an active material applied to the thin layer of conducting material.

In some embodiments, the coating may comprise a layered structure.

In some embodiments, the coating may have a surface layer applied thereto. The surface layer may comprise a capping layer.

In some embodiments, the coating includes an alloy.

In some embodiments, the coating may comprise a multiphase material.

Any suitable coating material, including suitable combinations of active and conducting material, for a specific battery application may be employed in the present invention.

Anode materials for lithium ion batteries include tin-based materials, including alloys and mixtures of tin with other metals such as copper, nickel, cobalt, antimony and the like, and combinations of these. Metal oxides such as nickel oxide, iron oxide, copper oxide, tin oxide, lithium oxide, aluminium oxide, lithium titanates and the like, and combinations of these, may also be used. Carbon and mixtures of carbon with other anode materials may also be used. Materials containing lithium metal and silicon may also be used.

Cathode materials for lithium ion batteries are also suitable materials for use in the present invention. Some common materials such as lithium manganese oxides, lithium cobalt oxides, lithium iron phosphates, and the like, and mixtures of these, may be employed in the methods of the present invention.

Cathode materials based on nickel may be employed in a range of nickel-based batteries, including nickel/metal hydride, nickel/zinc, and nickel/iron batteries. These cathodic materials may be nickel oxide, nickel oxyhydroxide, and nickel hydroxide and mixtures of these.

In some embodiments, carbon may be present in the coating. Carbon may be an active material, or it may be used as a conducting material, and can also protect the surface from undesirable surface reactions. Thus the carbon may be present as a surface coating. It may also be one phase in a composite structure, combined with other active material or active materials. It could also be combined with other conductors. The carbon could be directly coated onto the porous polymer substrate.

As mentioned above, in preferred embodiments of the present invention, the coating is a thin coating. Thin coatings of active material enable improved rate characteristics. In particularly preferred embodiments thin coatings of active material are provided on high surface area substrates to give improved capacity. In further preferred embodiments a thin conducting layer is provided that gives good conductivity whilst minimising weight and volume.

A wide range of coating structures may be employed in the present invention. For example, a conductive coating may first be applied to a substrate, then an active battery electrode material may be applied onto the conducting coating. In some embodiments, the coating may be a more complex composite material. For example, multiple layers of conducing material and active material may be applied. The coating may be a composite material in which conducting and active materials are intermingled in a complex manner. For example, some mixtures of different metals, eg. copper and tin, may provide a conducting network via one metal or alloy, and active material via another metal or alloy. The composite material may be comprised of more equiaxed regions of active material surrounded by a different material or materials.

In other embodiments, the coating may contain more than one active material, or an active material with several different charge/discharge reactions. Such materials display multiple charge/discharge peaks on cyclic voltammetry (CV) scans.

In some embodiments the active material is a metal alloy. The alloy may be a true alloy, i.e. an homogenous, single phase mixture of two or more different metals. Alternatively, the alloy may in fact be a mixture of two or more different metals, where regions of material are of different composition. For example, various alloys of tin with copper, antimony, cobalt, nickel and mixtures of these have been investigated as anode, materials for lithium ion batteries. In further embodiments, an alloy structure may be created by heat treating an initial coating which is comprised of separate regions of different composition. The heat treatment can partially or fully homogenise such regions to create an alloy.

In some embodiments, the structure of the coating imparts greater cycling stability to the battery material. For example, by confining battery materials that are prone to instability into nanometer-sized regions, stability may be enhanced. The nanometer-sized regions may be surrounded by a conducting material or by a different material. For example, in the case of a tin-based anode for lithium ion batteries, layers of tin may be separated by layers of carbon, or layers of copper, or layers of nickel, or combinations or mixtures of these. Alternatively, regions of tin, for example spherical-like regions, rather than layers may be separated by such layers.

In further embodiments, the coating may have a surface layer or layers that impart greater stability by improving resistance to reactions, for example to reactions with the electrolyte. These reactions can produce a surface layer often referred to as a surface electrolyte interphase layer. For example, carbon or polymer coatings may be utilised in lithium ion batteries to minimise surface reactions with the electrolyte. Coatings of metals, for example copper or nickel, may also be employed. Multiple surface layers or composite surface layers could also be utilised.

In other embodiments, the coating may be first deposited, then reacted in some way to form active material or to increase the amount of active material present. For example, a nickel coating may be deposited, then at least part of this coating may be oxidised to form a nickel oxide material, or a nickel oxyhydroxide material, or a nickel hydroxide material, or a mixture of these.

In further embodiments the coating may contain pores. Such pores may increase surface area and allow better ingress of ions from solution.

In some embodiments, the coating is not uniform through the substrate. For example, the coating may vary in structure, composition and/or thickness throughout the substrate. Preferably, the coating provides a good conducting network throughout the substrate. For example, a conducting material may cover the entire substrate (its thickness may or may not be substantially uniform) whereas an active material may not cover the entire conducting material-coated substrate. For example, the active material may extend inwards from one side of a porous polymer membrane, but not penetrate all the way through. Thus one side of the membrane remains as conducting material only. This may be advantageous for making electrical connection to the electrode.

Various methods can be used to provide the battery electrode coating. For example, electro-deposition, electro-less deposition, sol-gel methods, elecfroprecipitation (eg. electrodeposition of $Ni(OH)_2$ is thought to occur by first electroreduction of nitrate ions which locally raises pH, causing $Ni(OH)_2$ to precipitate) or electrophoretic deposition may be used. The structure may then be treated to improve the quality of material. For example, if a cathode material such as lithium manganese oxide is provided, this material may be subject to heat treatment to improve the crystal quality of the lithium manganese oxide. The structure should be able to essentially survive such treatment.

In one embodiment, a coated organic material is provided by applying a thin coating of conducting material onto a filter membrane. Examples of such materials are described in U.S. patent application 2009905532. The thin coating may be applied using a method called atomic layer deposition. This deposits a uniform coating through the thickness of the membrane.

In other embodiments, the coating may be applied by methods as described in our co-pending Australian provisional patent application number 2012900378, the entire contents of which are herein incorporated by cross reference.

Other methods for applying a coating that are known to the person skilled in the art may also be suitable for use in the present invention.

A porous material that exhibits good conductivity with only a thin coating may be advantageous for batteries. This is because weight may be minimised, and high energy density (Wh per kg) and high power densities may be achieved. In these embodiments, a further coating containing at least one active material is typically required in order to function as a battery electrode.

In these embodiments, a further coating containing at least one active material is required in order to function as a battery electrode.

In some embodiments, carbon in the coating may be applied by first depositing a suitable polymer onto the porous polymer substrate, or onto the porous polymer substrate already coated with some material, or simultaneously deposited with other materials onto the porous polymer substrate or coated porous polymer substrate. This polymer may then be at least partially pyrolysed by appropriate heat treatment to create carbon. The polymer may be applied by any suitable method. For example, the polymer could be applied by electrodeposition, or by impregnation of the porous polymer with a polymer-containing solution which is then dried and pyrolysed, or by adsorption or condensation from a vapour, or by chemical adsorption from a solution. Examples of electrodeposition of polymers and polymer-metal composites are given in the following references: Chipara et al, "Electrodeposition and Magnetic Properties of Polypyrrole-Fe Nanocomposites (2007), Materials Letters 61, pg 2412, Fujita et. al, "Preparation of Metal-Polymer Composite Films by the Metal Polymer co-electrodeposition Method", IEEE Transactions on Magnetics, Vol. 44, November 2008, and Jiasong et al, "Electrodeposition of Polymers on Carbon Fibers", Polymer Communications, no. 2, pg 1983.

An example of a chemical adsorption process is the sequential adsorption of oppositely charged polyelectmlytes, such as polyDADMAC and PSS. An example of such layering is given by Zhang et al, "Polyelectrolyte Multilayer as Matrix for Electrochemical Deposition of GoldClusters: Toward Super-Hydrophobic Surface," J. American Chemical Society. 2004, 126, pg. 3064-3065.

The porous polymer substrate itself may also be at least partially pyrolysed to provide carbon In some embodiments, the coating is reacted to form active material or increase the amount of active material present. This may be achieved by a chemical reaction in solution, or a reaction with a gaseous vapour, or an electrochemical reaction such as anodisation. Combinations of these could be used.

In some embodiments, methods are used to specifically create pores in the coating. For example, electrodeposition at high current can create porous coatings by creating bubbles during deposition. Electrodeposition into various organic-based templates, including surfactant-based templates such as liquid crystals and assembled micelle structures, can also be used followed by removal of the organic template to create pores. If the organic template is pyrolysed, the removal may leave some carbon.

In other embodiments, at least some of the carbon may be provided by pyrolysing the polymer substrate itself.

In a second aspect, the present invention also extends to methods for producing a battery electrode in accordance with the first aspect of the present invention.

In a third aspect, the present invention relates to a battery incorporating at least one battery electrode in accordance with the first aspect of the present invention. In one embodiment, the battery may incorporate an anode in accordance with the first aspect of the present invention and a cathode in accordance with the first aspect of the present invention.

BRIEF DESCRIPTION OF THE DRAWINGS

FIGS. 6a and 6b show scanning electron microscope images of the nickel-coated material from example 1;

FIG. 7 shows a CV scan of the nickel-coated material, treated with $H_2O_2$, from example 2;

DETAILED DESCRIPTION OF THE DRAWINGS

Figure 1:
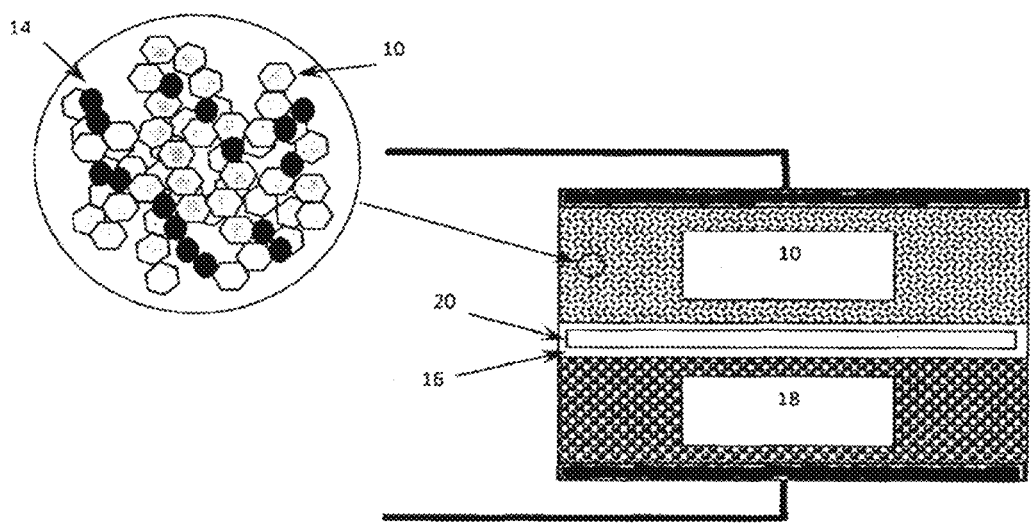
FIG. 1 shows a schematic chematic diagram of a conventional battery.
Figure 2:
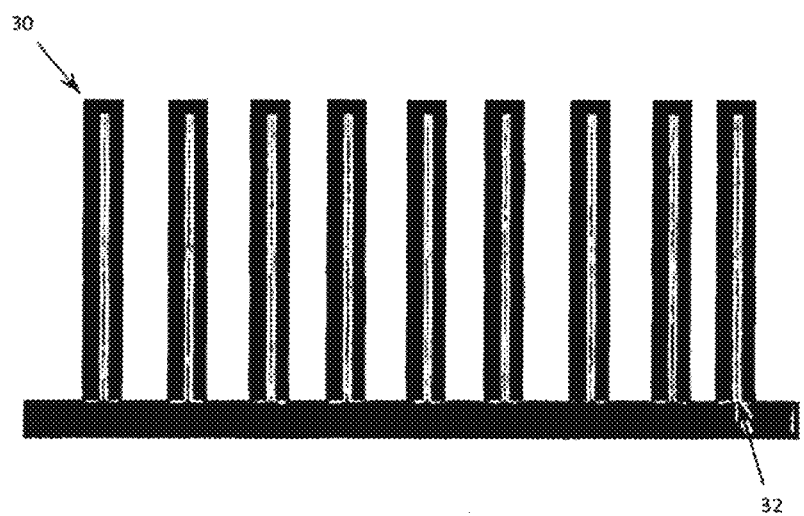
FIG. 2 shows a schematic diagram of a 3-D electrode.
Figure 3:
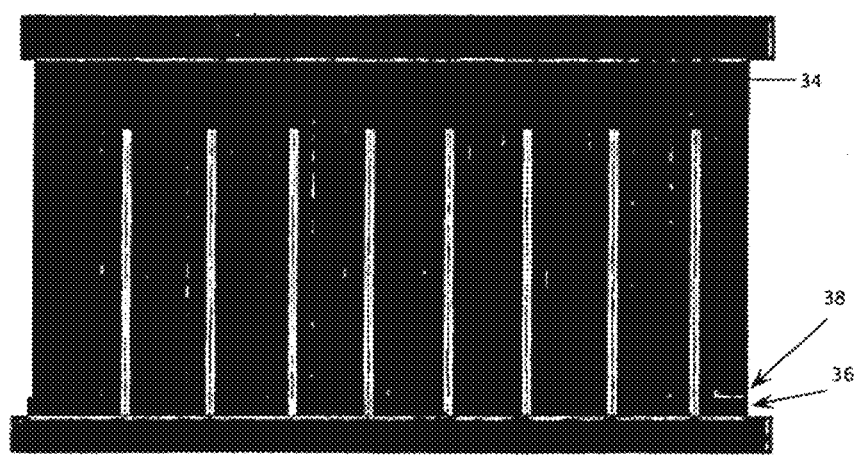
FIG. 3 shows a schematic diagram of a 3-D battery.
Figure 4A:
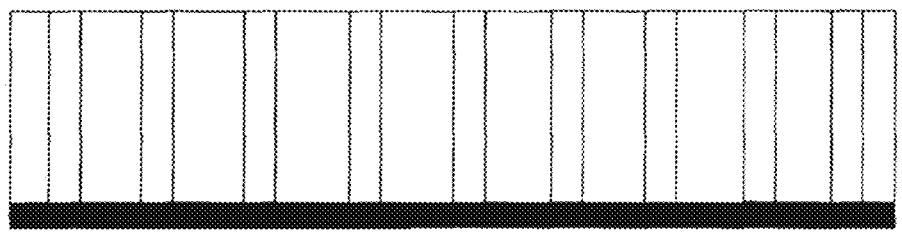
FIG. 4 shows a schematic diagram showing prior art method for making 3-D electrode where cylinders are formed inside a template.
Figure 4B:
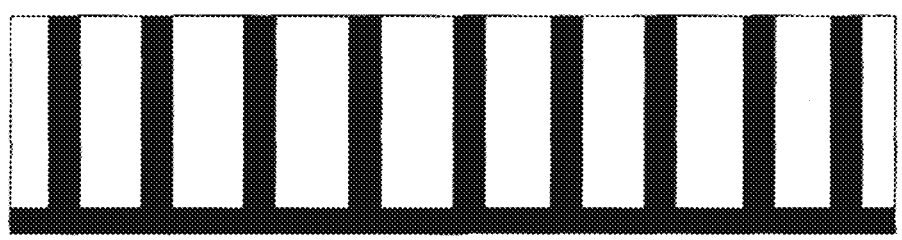
Figure 4C:
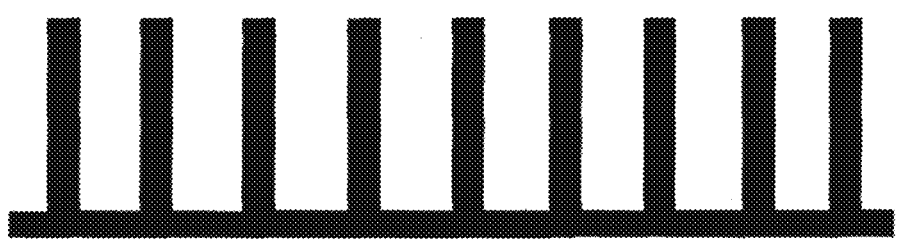
Figure 5A:
FIG. 5 shows a schematic diagram of one embodiment of the present invention.
Figure 5B:
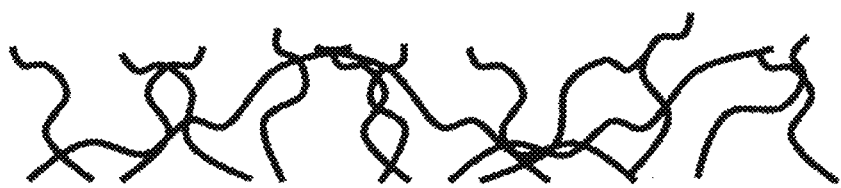
Figure 5C:
Figure 5D:
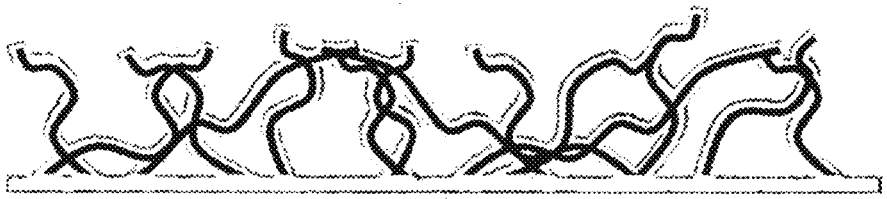
Figure 5E:
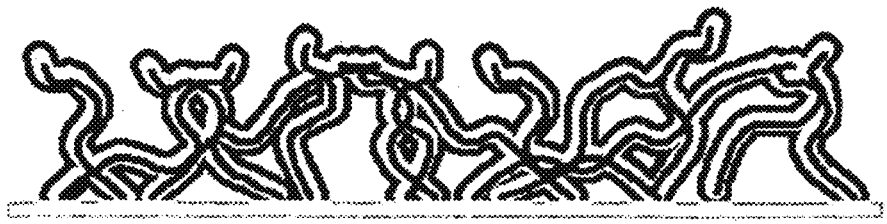

One embodiment of the present invention is shown schematically in FIG. 5. A porous polymeric framework (see FIG. 5A) is optionally coated with a first coating material or materials that may act as a seed layer for subsequent coatings (see FIG. 5B). The framework is then coated with a thin coating of conductive material (shown in FIG. 5C). This coating may simply be a conductor, or may also be a battery electrode material. The polymeric framework may then be optionally removed. This removal could occur at any stage during the process. A layer of metal backing material may then be applied (FIG. 5D). The thin conducting coating may then be coated with one or more battery electrode materials (FIG. 5E). The coating may be continuous or discontinuous, for example the coating may be comprised of particles. Various methods can be used to provide the battery electrode coating. For example, electro-deposition, electro-less deposition, sol-gel methods, or electrophoretic deposition may be used. The structure may then be treated to improve the quality of material. For example, if a cathode material such as lithium manganese oxide is provided, this material may be subject to heat treatment to improve the crystal quality of the lithium manganese oxide. The structure should be able to essentially survive such treatment.

The obtained structure may then be used as a 3-D electrode in a cell.

Alternatively the structure may be used as a basis for a full 3-D cell. In this case the structure may first be coated with a thin layer of a suitable solid polymeric electrolyte. The solid electrolyte may be applied, for example, via electro-deposition. The final counter electrode may be made, for example, by growing, via electro-deposition, the counter electrode material from an electrode into the porous structure.

Many variations of the invention may be envisaged. For example, the 3-D electrode may be a cathode or an anode. The electrodes may be comprised of first a conducting material and then one or more battery electrode materials, or alternatively the whole electrode may be one or more battery electrode material. For a 3-D cell, the anode may be deposited first, followed by the solid electrolyte and the cathode. However if the cathode is to be heat treated, it may be necessary to first deposit the cathode material since the solid polymer electrolyte may not survive the heat treatment.

In other embodiments, the electrode may be further coated with a solid electrolyte layer, such as a polymer electrolyte, for example a poly(acrylonitrile) or polyethylene glycol) diacrylate or PANI layer may be applied by electrodeposition. Such a coating is useful where the electrode is to be used in a complete 3-D battery.

In other embodiments, due to the porous structure of the electrodes, they may be useful in flow-type batteries, such as zinc bromine batteries. In some of these embodiments the electrolyte and/or a liquid cathode or anode material is flowed through the electrode.

Several methods may be used to deposit the coating onto the organic framework. For example, electro-deposition, electro-less deposition, sol-gel methods, atomic layer deposition, other chemical vapour techniques, physical vapour techniques or electrophoretic deposition may be used. In choosing a suitable coating method, suitable penetration of the coating into the porous framework is a prime concern. It will be understood that the present invention encompass any suitable method that can be used to form a coating on a porous polymeric material.

In other embodiments, the coating may contain more than one active material, or an active material with several different charge/discharge reactions. Such materials display multiple charge/discharge peaks on current/voltage (CV) scans.

A porous material that exhibits good conductivity with only a thin coating may be advantageous for batteries. This is because weight may be minimised, and high energy density (Wh per kg) and high power densities may be achieved.

EXAMPLES

By way of example, the following are various embodiments of the invention.

Example 1

Nickel (Ni) was coated on a 0.45 μm cellulose acetate filter membrane using electroless deposition. The surface area of this substrate is estimated at ~2.3 $m^2$/cc. The volume fraction of polymer is about 34%. The thickness is about 127 μm. The membrane was coated with a seed layer prior to electroless deposition. Scanning electron microscopy (SEM) images and energy dispersive spectroscopy (EDS) results indicated that Ni coatings were formed all through the 3D porous structure of the membrane. SEM images are shown in FIGS. 6(a) and 6(b). The weight measurements and SEM results also showed that the thickness of the Ni coatings was about 120~130 nm for a deposition time of 90 minutes. This material was tested for resistance using point probes, and less than 1 ohm resistance was measured.

EDS results from different points throughout the thickness of the membrane material are shown in table 1. The nickel content is reasonably uniform through the thickness of the membrane.

TABLE 1

EDS results (at %) of regions through the thickness of the membrane for the material in example 1.

|    | C    | O    | Na  | Al  | Ni   | Cu  | Ni/C |
|----|------|------|-----|-----|------|-----|------|
| A1 | 20.4 | 11.6 | 0.5 | 0.1 | 67.2 | 0.2 | 3.3  |
| A2 | 19.1 | 9.2  | —   | —   | 71.7 | —   | 3.8  |
| A3 | 25.1 | 10.2 | 0.4 | —   | 64.3 | —   | 2.6  |
| A4 | 34.3 | 15.0 | 1.0 | 0.1 | 49.7 | —   | 1.5  |
| A5 | 20.8 | 9.4  | 0.1 | 0.1 | 69.7 | —   | 3.4  |

Example 2

A membrane sample coated with Ni was prepared in a similar manner to example 1, except with a deposition time of 60 minutes (the thickness was estimated to be about 90~100 nm). This was treated with 30% hydrogen peroxide/water solution. This material was tested for resistance using point probes, and measured between 10 and 30 ohms. This material was tested as a cathode using cyclic voltammetry (CV). Platinum coated titanium mesh was used as the counter electrode, Hg/HgO as the reference electrode and the Ni-coated membrane sample as the working electrode. 6.0 M KOH was used as the electrolyte, and the CV sweep rate was 1.0 mV/s. A CV scan is shown in FIG. 7. CV results showed a pair of repeatable oxidation and reduction peaks, corresponding to the charge and discharge peaks of the material.

Example 3

Figure 8:
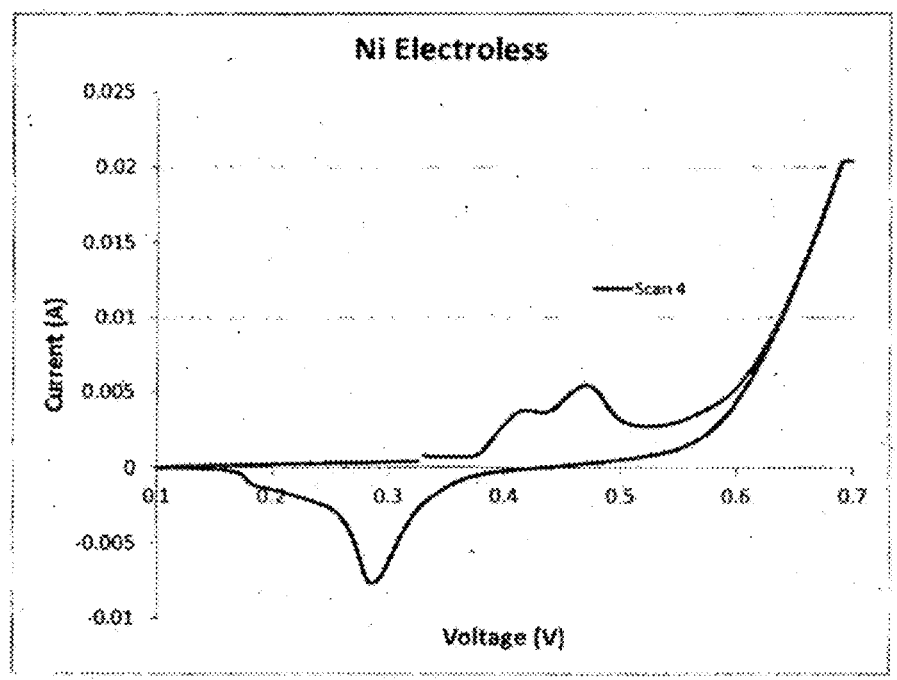
FIG. 8 shows a CV scan of the nickel-coated material from example 3.

A material was prepared similarly to example 2, however without the $H_2O_2$ treatment. A CV scan is shown in FIG. 8. This material also displays several repeatable charge/discharge peaks. The inventors believe that this as-deposited material is comprised of a mixture of materials that might include nickel, nickel oxide, nickel oxyhydroxide and nickel hydroxide.

Example 4

Figure 9:
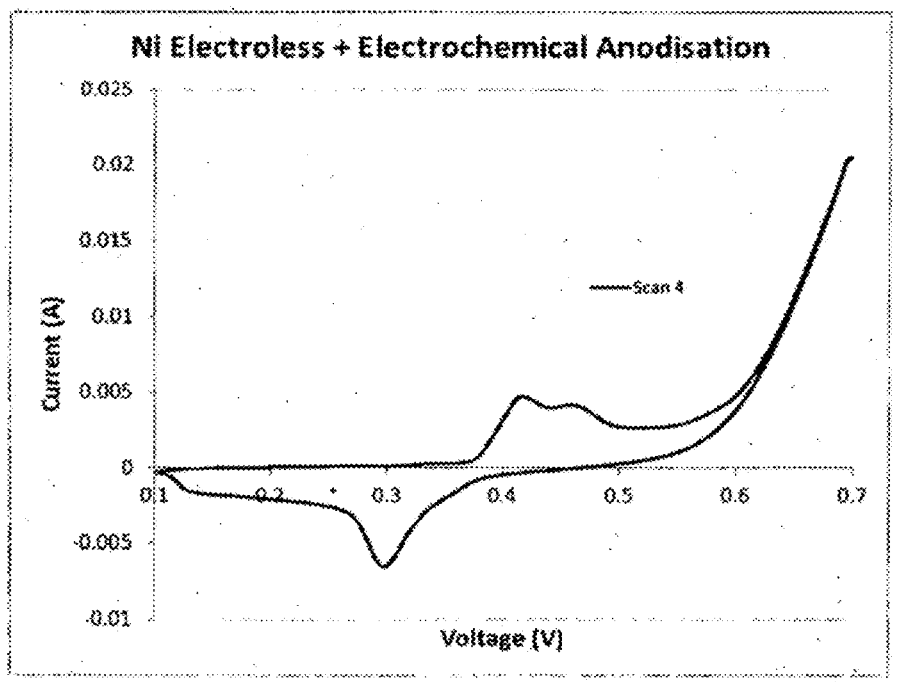
FIG. 9 shows a CV scan of the nickel-coated material, anodically oxidised, from example 4.

A material was prepared similarly to example 3. The material was subsequently electrochemically anodised. The anodization was conducted via flow through of a solution consisting of 0.5 M $NiSO_4$, 0.5 M $Na_2SO_4$ and 0.5 M $CH_3COONa$. Anodic pulses (1.7 V, 1 s on, 4 s off, 1.5 h deposition time) were applied to the Ni coated membrane sample using a stainless steel counter-electrode at room temperature. Then the anodised Ni sample was tested as a cathode material of nickel-based batteries using (CV). A CV scan is shown in FIG. 9. CV results showed a pair of repeatable oxidation and reduction peaks, corresponding to the charge and discharge peaks of the material.

Example 5

Figure 10:
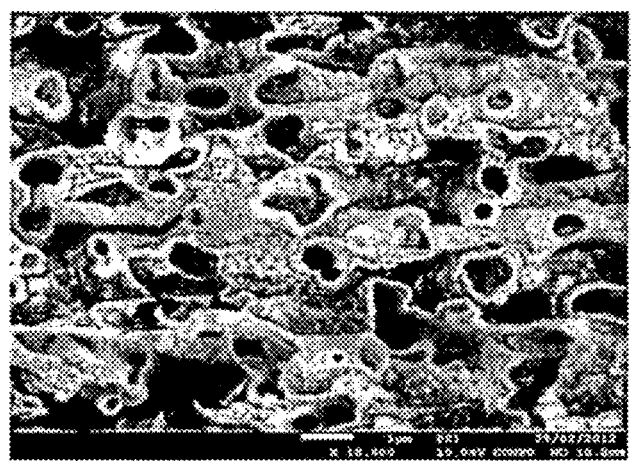
FIG. 10 shows a SEM micrograph of a copper-coated material similar to example 5.

Copper was deposited by electroless deposition onto a 0.44 μm cellulose acetate filter membrane. The membrane was coated with a seed layer prior to electroless deposition. SEM and EDS results for similar materials showed a copper coating, ~70-90 nm thick, throughout the material. An SEM image is shown in FIG. 10. The material was tested for resistance with point probes and measured<~several ohms. This was followed by a tin coating, again via electroless deposition. The material was heat treated at ~170° C. under argon for ~4 h.

Figure 11:
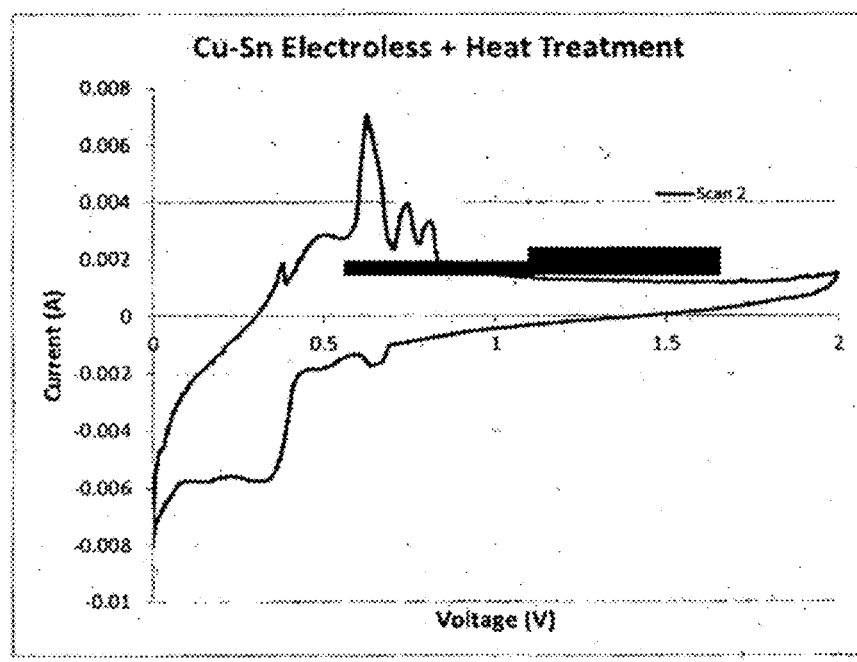
FIG. 11 shows a CV scan of the copper tin anode material of example 5.

The material was tested as an anode material using CV scans. A two electrode setup with an electrolyte consisting of 1M $LiPF_6$ in an equal ratio mix of ethylene carbonate and diethyl carbonate was used, with lithium metal as both counter and reference electrode. A Cellguard 2500 separator was used. A CV scan is shown in FIG. 11. Repeatable charge and discharge peaks are present.

Comparative Example 1

Figure 12:
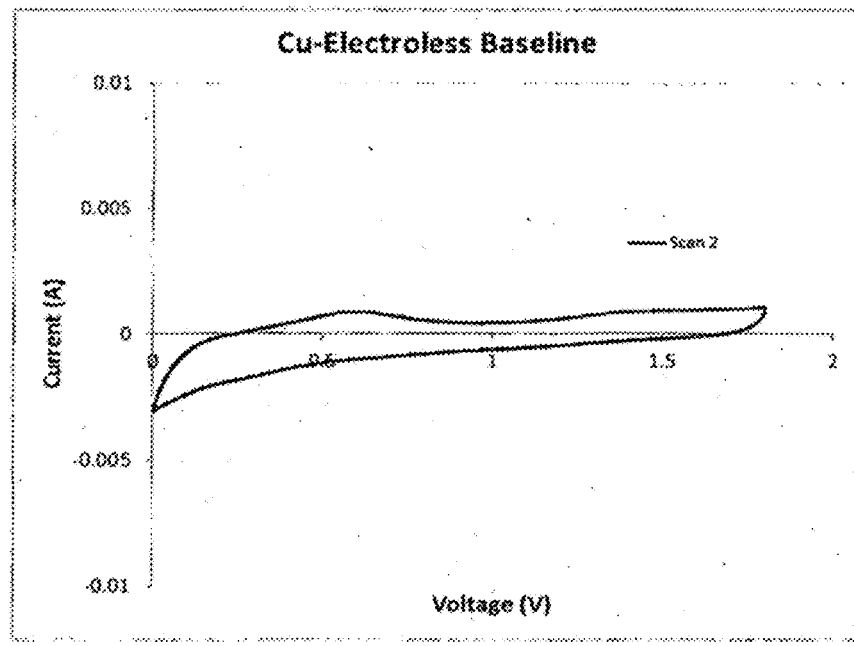
FIG. 12 shows a CV scan of the copper material from comparative example 1.

A material was prepared in a similar manner to example 5, but without the tin coating. A CV scan is shown in FIG. 12. There are no major charge/discharge peaks.

Example 6

Figure 13:
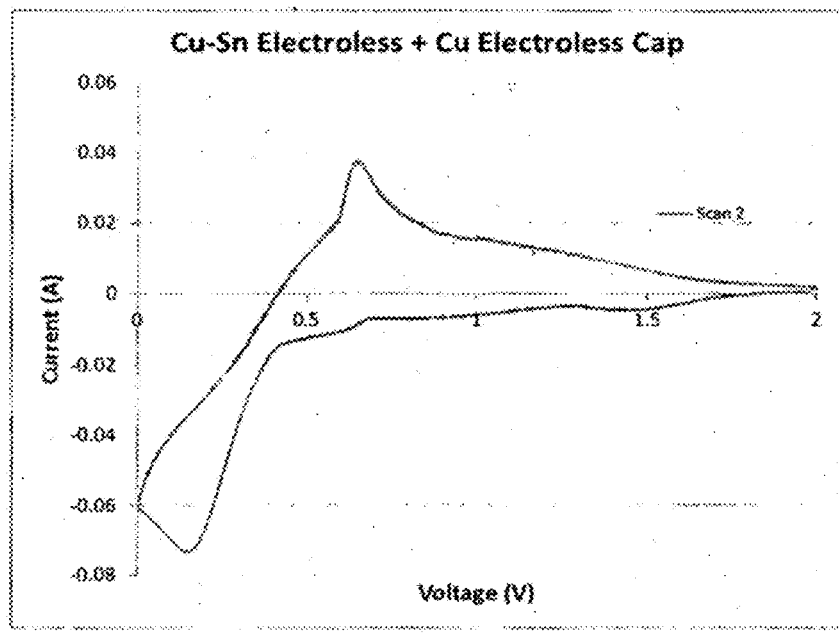
FIG. 13 shows a CV scan of the copper tin anode material, with copper cap layer, of example 6.

A material was prepared in a similar manner to example 5, except an additional copper 'cap' layer was applied on top of the tin, using electroless deposition. The material became visibly copper coloured after application of the cap. FIG. 13 shows a CV scan. Several pairs of charge/discharge peaks are present.

Example 7

Figure 14:
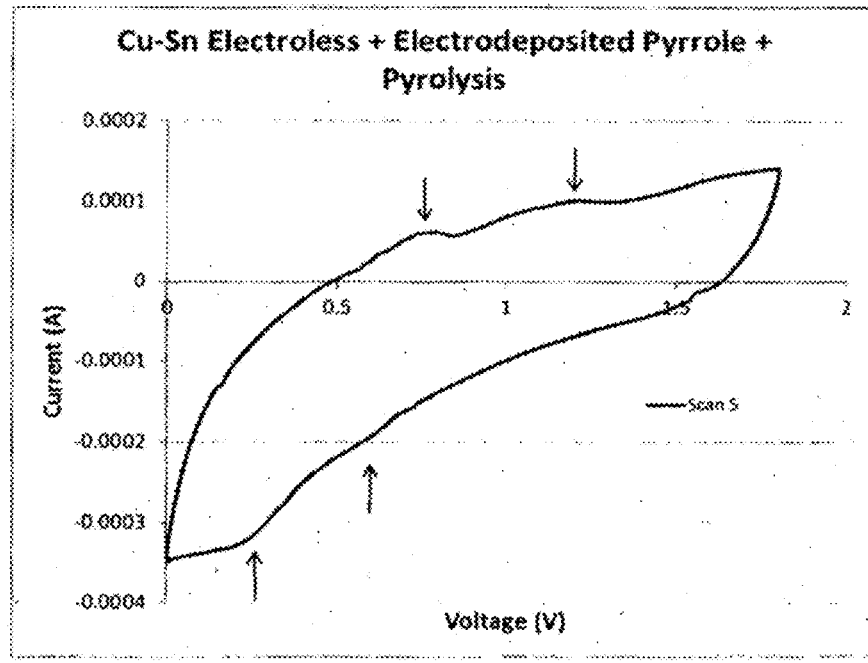
FIG. 14 shows a CV scan of the copper tin anode material, with pyrrole cap and pyrolysed, of example 7.

A material was prepared in a similar manner to example 5 except that the membrane was 0.2 μm with a surface area of about 4.6 $m^2$/cc. This sample was subsequently coated with polypyrrole by electrodeposition of pyrrole monomer from a 0.1M aqueous solution at +2V relative to a stainless steel counter electrode. The deposition proceeded for ~8 min. After coating, the sample was visually darkened. This sample was subsequently heat treated at ~210° C. under flowing nitrogen, for ~5 mins. After heat treatment, the sample was dark, indicating carbon formation from pyrolysis. The inventors believe it is likely that both the polypyrrole and the cellulose acetate membrane were at least partially pyrolysed to create the carbon. CV scans of this material showed repeatable charge and discharge peaks. A CV scan of this material is shown in FIG. 14.

Comparative Example 2

Figure 15:
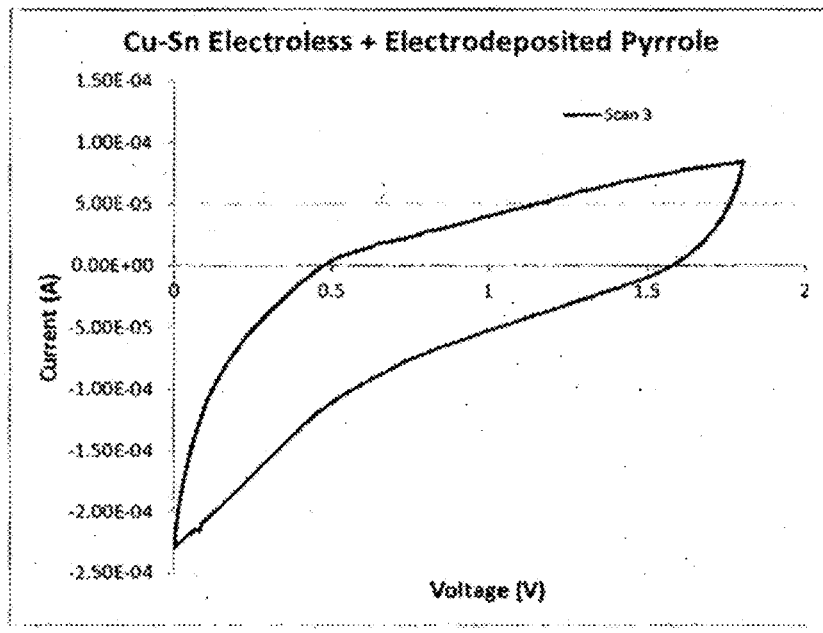
FIG. 15 shows a CV scan of the copper tin anode material, with pyrrole cap, of comparative example 2.

A material was prepared similarly to example 7, but without pyrolysis. A CV scan of this material is shown in FIG. 15. There are no charge and discharge peaks present. This indicates that the material has been covered with a polypyrrole layer of sufficient thickness to block access by ions. Comparison with example 7 shows that the material may be activated by at least partial pyrolysis.

Example 8

Figure 16:
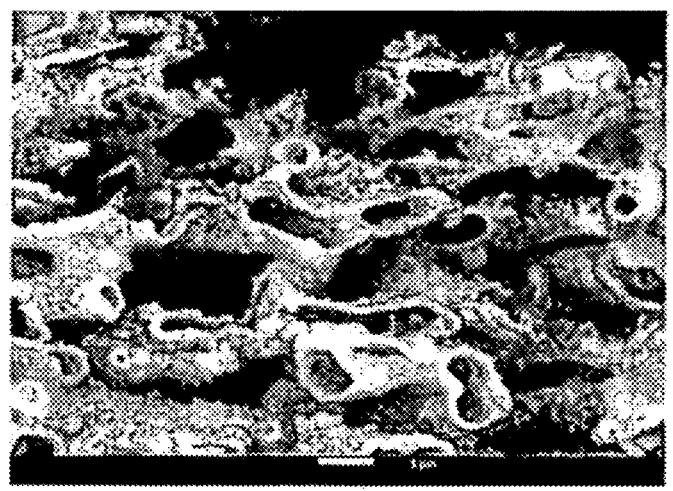
FIG. 16 shows a SEM image of the copper tin anode material, with tin via electrodeposition, of example 8.
Figure 17:
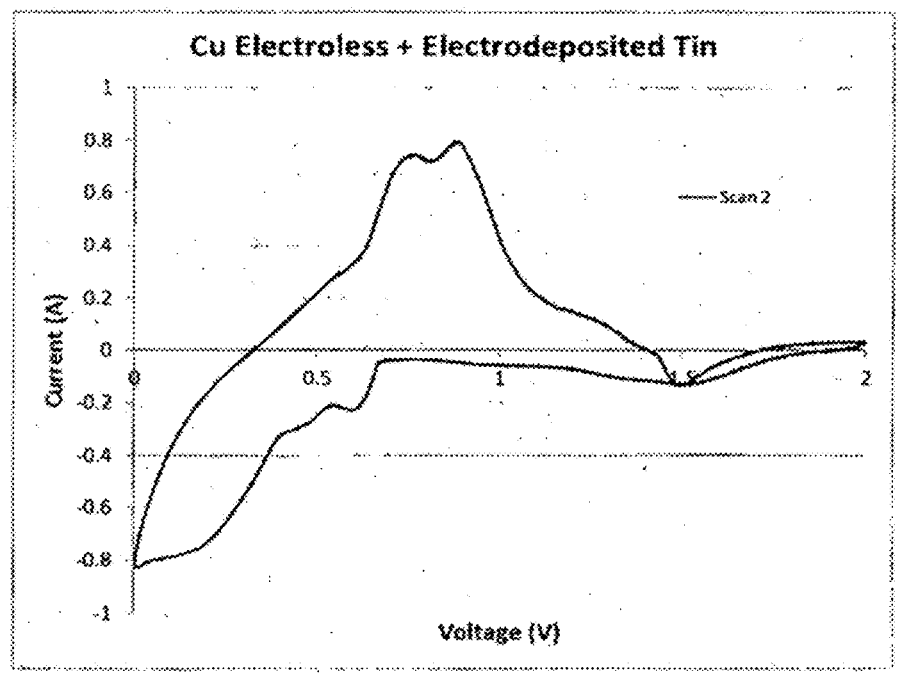
FIG. 17 shows a CV scan of the copper tin anode material, with tin via electrodeposition, of example 8.

A copper-coated 0.45 μm membrane cellulose acetate membrane was prepared in a similar manner to example 1. Tin was electrodeposited onto this membrane by flowing electrolyte through the membrane and applying a voltage of about −2V relative to a stainless steel counter electrode. After deposition, it was observed visually that the back of the membrane was not coated with tin. An SEM image of the coated structure is shown in FIG. 16. The total coating thickness varied somewhat throughout the structure but is estimated as ~100 nm. The amount of tin varied from ~5 at % to ~15 at % through the structure, except near the back surface which contained little tin. CV scans showed repeatable charge and discharge peaks. An example scan is shown in FIG. 17.

Example 9

Figure 18:
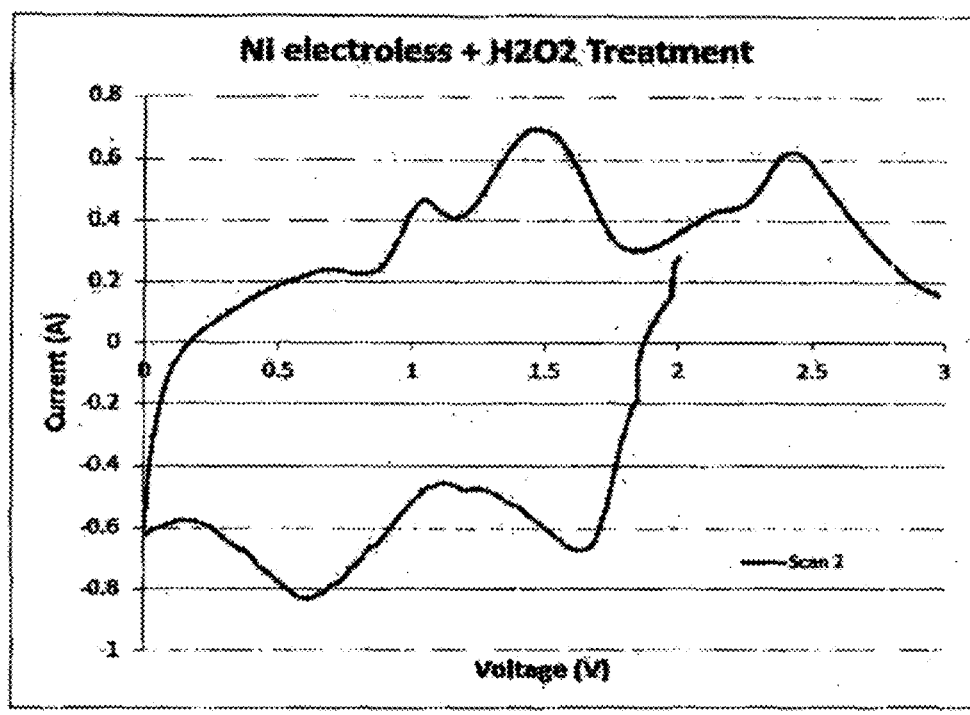
FIG. 18 shows a CV scan of the nickel-based material of example 9.

A nickel-based material was prepared in a similar manner to example 2. This material was tested as an anode for a lithium ion battery. A CV scan is shown in FIG. 18. Several charge/discharge peaks are present.

The invention claimed is:

1. A battery electrode comprising
   i) a porous polymeric material, the polymeric material comprising a non-conductive polymeric material and
   ii) a coating on the porous polymeric material, the coating comprising a conductive material and an active material, wherein the coating is less than 500 nm thick and wherein the coating extends through the thickness of the polymeric material.

2. An electrode as claimed in claim 1 wherein the porous polymeric material has a specific surface area of at least 0.1 $m^2/cc$, or greater than 0.2 $m^2/cm^3$, or greater than 1 $m^2/cm^3$, or greater than 4 $m^2/cm^3$, or greater than 10 $m^2/cm^3$, even further preferably greater than 50 $m^2/cm^3$.

3. An electrode as claimed in claim 1 wherein the coating on the porous polymeric material is less than 200 nm thick, or less than 100 nm thick, or less than 50 nm thick, or less than 20 nm thick.

4. An electrode as claimed in claim 1, wherein the electrode comprises a battery electrode.

5. An electrode as claimed in claim 1 wherein the coating comprises a conductive material and an active battery material.

6. A electrode as claimed in claim 1 wherein the conductive material is continuous.

7. An electrode as claimed in claim 1 wherein the electrode further includes a layer of backing material.

8. An electrode as claimed in claim 7 wherein the backing material comprises a layer of metal.

9. An electrode as claimed in claim 1 wherein the coating applied to the porous polymeric material comprises a continuous coating or a discontinuous coating.

10. An electrode as claimed in claim 1 wherein the coating extends substantially through the thickness of the porous polymeric material.

11. An electrode as claimed in claim 1, wherein the coating provides conductivity to the electrode.

12. An electrode as claimed in claim 1 wherein the porous polymeric material has a tortuous pore structure, complex pore structure, or a combination thereof.

13. An electrode as claimed in claim 1 wherein the porous polymeric material has a volume fraction of pores of about 34%.

14. An electrode as claimed in claim 1 wherein a maximum particle size of a particle that can pass through the porous polymeric material is less than 10 μm.

15. An electrode as claimed in claim 1 wherein the thickness of the porous polymeric material falls within the range of several nanometers to 1 mm.

16. An electrode as claimed in claim 15 wherein the thickness of the porous polymeric material is at least 100 μm.

17. An electrode as claimed in claim 1 wherein the polymeric material is selected from cellulose, cellulose acetate, cellulose nitrate, a mixed cellulose ester, nylon, polytetrafluoroethylene (PTFE), polyether sulfone (PES), a polyamide, a vinyl polymer or a polycarbonate.

18. An electrode as claimed in claim 1 wherein the porous polymeric material comprises a filter membrane.

19. An electrode as claimed in claim 1 wherein the porous polymeric material comprises a cellulose-based filter membrane.

20. An electrode as claimed in claim 1 wherein porous polymeric material comprises cellulose acetate.

21. An electrode as claimed in claim 1 wherein the coating comprises a layer comprising the conductive material and a layer comprising the active material.

22. An electrode as claimed in claim 21 wherein the layer comprising the conductive material is applied to the porous polymeric material and the layer comprising the active material is applied to the layer comprising the conductive material.

23. An electrode as claimed in claim 1 wherein the coating comprises a composite material comprising the conductive material and the active material.

24. An electrode as claimed in claim 1 wherein the coating further comprises an inert material, non-conducting material, or a combination thereof.

25. An electrode as claimed in claim 1 wherein the coating further comprises a surface layer, a capping layer, or a combination thereof.

26. An electrode as claimed in claim 25 wherein the surface layer and/or the capping layer comprises an alloy material, a multi-phase material, or a combination thereof.

27. An electrode as claimed in claim 1 wherein the coating includes an alloy.

28. An electrode as claimed in claim 1 wherein the conductive material comprises a metal, a metal alloy, a conductive polymer, carbon, or any combinations thereof.

29. An electrode as claimed in claim 28 wherein the conductive material comprises one or more of copper, tin or nickel.

30. An electrode as claimed in claim 1 wherein the active material comprises an active battery material.

31. An electrode as claimed in claim 30 wherein the active material comprises an anode material.

32. An electrode as claimed in claim 31 wherein the active material is selected from tin-based materials, alloys and mixtures of tin with other metals selected from one or more of copper, nickel, cobalt, antimony, and combinations thereof, metal oxides selected from one or more of nickel oxide, iron oxide, copper oxide, tin oxide, lithium oxide, aluminium oxide, lithium titanates, materials containing lithium metal and silicon and combinations thereof.

33. An electrode as claimed in claim 31 wherein the active material comprises a cathode material.

34. An electrode as claimed in claim 33 wherein the active material is selected from lithium manganese oxides, lithium cobalt oxides, lithium iron phosphates, and mixtures of thereof, nickel oxide, nickel oxyhydroxide, and nickel hydroxide and mixtures thereof.

35. An electrode as claimed in claim 1 wherein carbon is present in the coating.

36. An electrode as claimed in claim 1 wherein multiple layers of conductive material and active material are applied to the porous polymeric material.

37. An electrode as claimed in claim 1 wherein the porous substrate has been partly or wholly removed after the coating has been applied to the porous polymeric material.

38. An electrode as claimed in claim 37 wherein the porous polymeric material has been partly or wholly removed by pyrolysis.

39. An electrode as claimed in claim 1 wherein at least part of the conductive material is converted to the active material to form the coating.

40. An electrode as claimed in claim 1 wherein the coating is substantially free of precious metals.

41. An electrode as claimed in claim 32 wherein the active material is mixed with carbon and/or mixtures of carbon.

* * * * *